(12) United States Patent
Taniguchi

(10) Patent No.: US 11,024,011 B2
(45) Date of Patent: Jun. 1, 2021

(54) IMAGE DISPLAY APPARATUS AND IMAGE DISPLAY METHOD

(71) Applicant: ALPINE ELECTRONICS, INC., Tokyo (JP)

(72) Inventor: Keita Taniguchi, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 90 days.

(21) Appl. No.: 16/551,969

(22) Filed: Aug. 27, 2019

(65) Prior Publication Data
US 2020/0074594 A1 Mar. 5, 2020

(30) Foreign Application Priority Data

Aug. 29, 2018 (JP) .............................. JP2018-160618

(51) Int. Cl.
| | | |
|---|---|---|
| *G06T 3/60* | (2006.01) | |
| *B60R 1/02* | (2006.01) | |
| *G06T 7/11* | (2017.01) | |
| *G06T 7/30* | (2017.01) | |
| *G06T 3/20* | (2006.01) | |

(52) U.S. Cl.
CPC .................. *G06T 3/60* (2013.01); *B60R 1/02* (2013.01); *G06T 3/20* (2013.01); *G06T 7/11* (2017.01); *G06T 7/30* (2017.01)

(58) Field of Classification Search
CPC ..... G06T 3/60; G06T 7/11; G06T 7/30; G06T 3/20; G06T 7/10; G06T 2207/20132; B60R 1/02; B60R 2300/30; B60R 1/00; H04N 5/2628; H04N 5/23293; H04N 5/2257;
(Continued)

(56) References Cited

U.S. PATENT DOCUMENTS 10,676,028 B2 * 6/2020 Taniguchi ................. B60R 1/12
2009/0010630 A1   1/2009 Higashibara et al.
(Continued)

FOREIGN PATENT DOCUMENTS

CN    1964484 A  *  5/2007  ............... B60R 1/00
CN  105711499 B  *  4/2019  ............... B60R 1/00
(Continued)

OTHER PUBLICATIONS

Extended European Search Report for 19194085.7 dated Jan. 16, 2020.

*Primary Examiner* — Charles T Shedrick
(74) *Attorney, Agent, or Firm* — IPUSA, PLLC

(57) ABSTRACT

An image display apparatus includes an imaging device configured to generate image data; a receiving unit configured to receive movement of a display area in a vertical direction or in a horizontal direction within the image data, the display area being displayed on a display device, and also receive rotation of the image data; an image processing unit configured to rotate the image data in accordance with an amount of rotation, and, in a case where the movement of the display area in the vertical direction or in the horizontal direction is received with respect to the rotated image data, move the display area in the vertical direction or in the horizontal direction within the rotated image data; an image cutting unit configured to cut the display area from the image data; and an outputting unit configured to display the display area on the display device.

7 Claims, 16 Drawing Sheets

(58) Field of Classification Search
CPC ............... H04N 7/18; G06F 3/04845; G06F 2203/04806
See application file for complete search history.

(56) References Cited

U.S. PATENT DOCUMENTS

| | | |
|---|---|---|
| 2010/0007734 A1 | 1/2010 | Yamazaki et al. |
| 2010/0039548 A1* | 2/2010 | Sakai ............... H04N 5/232935 348/333.12 |
| 2017/0021770 A1 | 1/2017 | Arai et al. |
| 2018/0365859 A1* | 12/2018 | Oba .......................... B60R 1/00 |
| 2019/0084481 A1* | 3/2019 | Diedrich .................. B60R 1/04 |
| 2020/0094740 A1* | 3/2020 | Taniguchi ................ B60R 1/00 |
| 2020/0101906 A1* | 4/2020 | Kobayashi ........... H04N 5/2257 |
| 2020/0333934 A1* | 10/2020 | Pestl ..................... F21V 33/004 |

FOREIGN PATENT DOCUMENTS

| | | | | |
|---|---|---|---|---|
| CN | 109572552 A | * | 4/2019 | ............... B60R 1/00 |
| CN | 110877573 A | * | 3/2020 | ............ B60W 30/06 |
| CN | 110936894 A | * | 3/2020 | ............ H04N 5/445 |
| CN | 111016789 A | * | 4/2020 | |
| EP | 3618420 A1 | * | 3/2020 | ............... G06T 7/30 |
| JP | 2012-195634 | | 10/2012 | |
| JP | 2016-167859 | | 9/2016 | |

\* cited by examiner

IF DISPLAY AREA IS CUT IN THIS STATE, IMAGE DISPLAYED ON IN-VEHICLE DISPLAY BECOMES TILTED

BY ROTATING IMAGE, IMAGE DISPLAYED BECOMES HORIZONTAL

DISPLAY AREA IS MOVED
TO THE RIGHT AND
ALSO MOVED VERTICALLY
(DISPLAY AREA IS OBLIQUELY MOVED)

BY ROTATING IMAGE,
IMAGE DISPLAYED BECOMES HORIZONTAL

AFTER ROTATION, IMAGE DISPLAYED
CAN BE MOVED UP, DOWN, LEFT, OR RIGHT ONLY

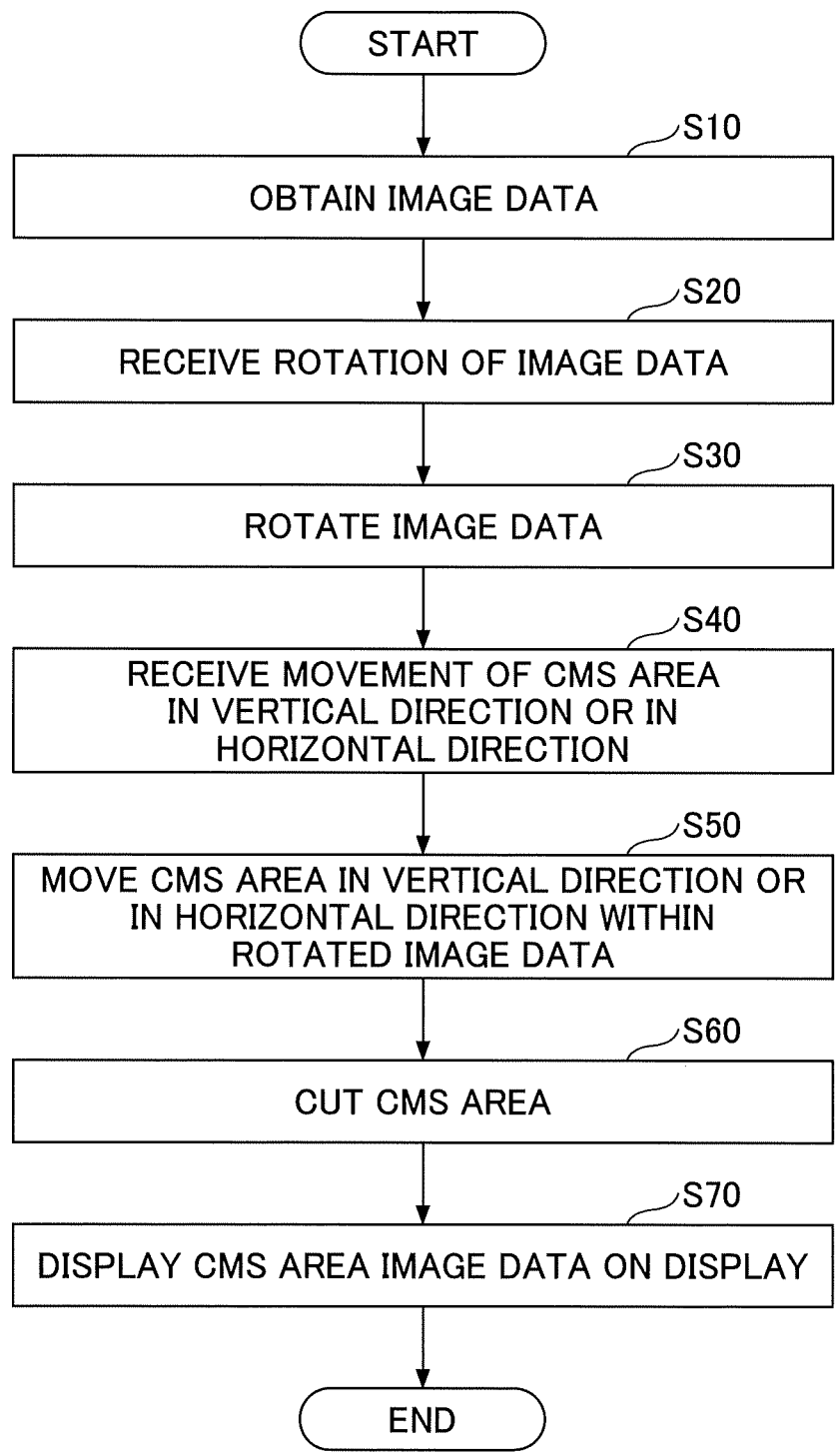

IF DISPLAY AREA IS CUT IN THIS STATE,
IMAGE DISPLAYED ON
IN-VEHICLE DISPLAY BECOMES TILTED

DISPLAY AREA IS MOVED TO LEFT

ALTHOUGH IMAGE BECOMES
HORIZONTAL AFTER ROTATED,
DISPLAY AREA IS MOVED DOWNWARD

IF DISPLAY AREA IS CUT IN THIS STATE,
IMAGE DISPLAYED ON
IN-VEHICLE DISPLAY BECOMES TILTED

DISPLAY AREA IS MOVED TO LEFT

DISPLAY AREA IS NOT VERTICALLY MOVED

IMAGE DISPLAY APPARATUS AND IMAGE DISPLAY METHOD

CROSS-REFERENCE TO RELATED APPLICATIONS

This application is based on and claims priority to Japanese Patent Application No. 2018-160618, filed on Aug. 29, 2018, the entire contents of which are incorporated herein by reference.

BACKGROUND OF THE INVENTION

1. Field of the Invention

The disclosures herein relate to an image display apparatus and an image display method.

2. Description of the Related Art

There has been an attempt to replace a vehicle rearview mirror with a camera monitoring system (CMS). The CMS is a technique that displays an image captured by an imaging device on a display. Such a rearview mirror employing the CMS is hereinafter referred to as electronic rearview mirror. The electronic rearview mirror takes the form of a related-art rearview mirror equipped with a built-in display. In the related-art rearview mirror, rearward vision may be obstructed by a vehicle occupant and luggage. Conversely, in the electronic rearview mirror, images of an imaging device provided on the rear of a vehicle are displayed on a display included in the rearview mirror, thus enabling better rear visibility.

Generally, it is difficult to install an imaging device on a vehicle without any installation error. Due to installation error of the imaging device, an image captured by the imaging device may be rotated and an image may fail to be captured in a desired direction. Further, in related-art rearview mirrors, it is common to adjust the angle of a rearview mirror to the direction desired by the driver. In electronic rearview mirrors, a function for receiving adjustment of a display area is provided (see Patent Document 1 and Patent Document 2, for example). Patent Document 1 describes a technique that moves a display area displayed by an electronic rearview mirror up, down, left, and right in accordance with the angle of the electronic rearview mirror. Patent Document 2 describes a technique that zooms in or zooms out an image displayed by an electronic rearview mirror by applying the pushing or pulling force to the electronic rearview mirror.

However, in the related-art techniques, it may be difficult to adjust a display area to the position intended by a driver.

RELATED-ART DOCUMENTS

Patent Documents

Patent Document 1: Japanese Laid-Open Patent Publication No. 2012-195634
Patent Document 2: Japanese Laid-Open Patent Publication No. 2016-167859

SUMMARY OF THE INVENTION

It is a general object of the present invention to provide an image display apparatus that readily adjusts a display area to a desired position.

According to an embodiment of the present invention, an image display apparatus includes an imaging device configured to generate image data; a receiving unit configured to receive movement of a display area in a vertical direction or in a horizontal direction within the image data, the display area being displayed on a display device, and also rotation of the image data; an image processing unit configured to rotate the image data in accordance with an amount of rotation received by the receiving unit, and, in a case where the movement of the display area in the vertical direction or in the horizontal direction is received by the receiving unit with respect to the rotated image data, move the display area in the vertical direction or in the horizontal direction within the rotated image data; an image cutting unit configured to cut, from the image data rotated by the image processing unit, the display area moved by the image processing unit; and an outputting unit configured to display the display area cut by the image cutting unit on the display device.

According to an embodiment of the present invention, an image display method includes generating, by an imaging device configured, image data; receiving, by a receiving unit, movement of a display area in a vertical direction or in a horizontal direction within the image data, the display area being displayed on a display device, and also rotation of the image data; rotating, by an image processing unit, the image data in accordance with an amount of rotation received by the receiving unit, and, in a case where the movement of the display area in the vertical direction or in the horizontal direction is received by the receiving unit with respect to the rotated image data, moving the display area in the vertical direction or in the horizontal direction within the rotated image data; cutting, by an image cutting unit, from the image data rotated by the image processing unit, the display area moved by the image processing unit; and displaying, by an outputting unit, the display area cut by the image cutting unit on the display device.

BRIEF DESCRIPTION OF THE DRAWINGS

Other objects and further features of the present invention will be apparent from the following detailed description when read in conjunction with the accompanying drawings, in which:

FIG. 8 is a flowchart illustrating an example of a process in which the electronic rearview mirror displays CMS area image data;

DESCRIPTION OF THE EMBODIMENTS

According to an embodiment of the present invention, it is possible to provide an image display apparatus that readily adjusts a display area to a desired position.

Figure 1A:
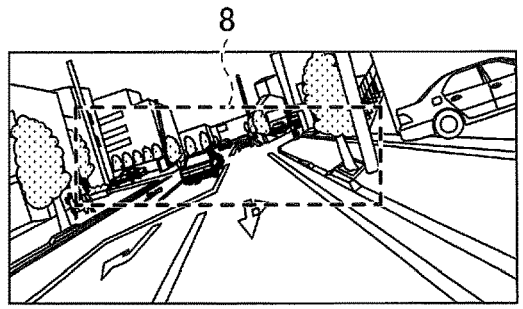
FIGS. 1A through 1G are drawings illustrating positional adjustment of a display area displayed by an electronic rearview mirror.
Figure 1B:
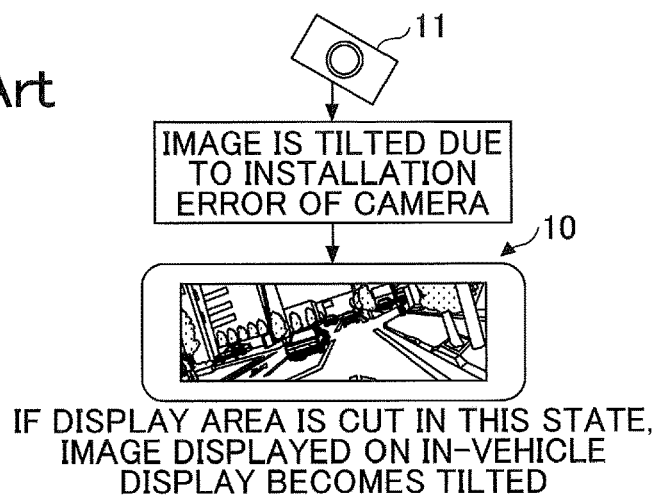

Prior to describing an embodiment of the present invention, the above-described related art will be described with reference to FIGS. 1A through 1G. FIGS. 1A through 1G are drawings illustrating an example of positional adjustment of a display area displayed by an electronic rearview mirror. FIG. 1A illustrates image data captured by an imaging device 11. The imaging device 11, installed on the rear of a vehicle, is rotated clockwise (rotated counterclockwise when viewed in the optical axis direction) due to installation error. FIG. 1B illustrates an image of a display area (hereinafter referred to as a CMS area 8) that is cut out from the image data and is displayed by an electronic rearview mirror 10. Because the imaging device 11 is rotated, the image data is tilted, and the image displayed by the electronic rearview mirror 10 is also tilted. Accordingly, a driver desires to cause the image to be horizontal.

Figure 1C:
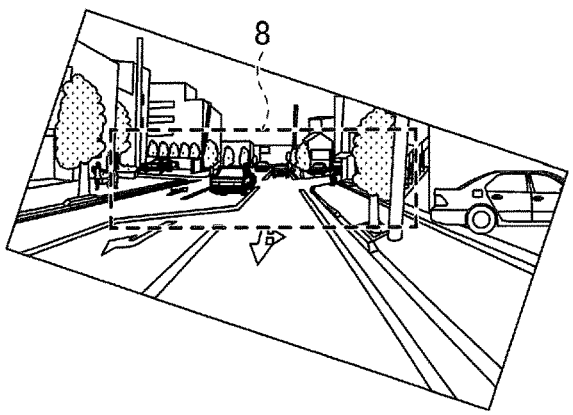
Figure 1D:
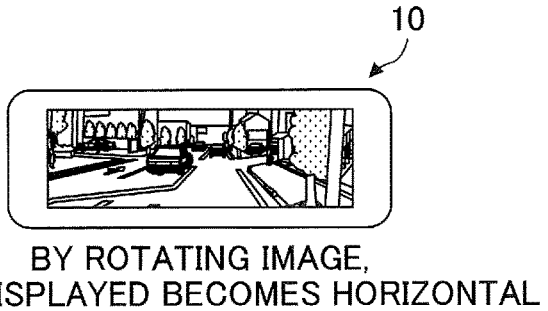

The driver can adjust the image displayed by the electronic rearview mirror, by using a setting screen provided and available to the driver. In this case, the driver rotates the image clockwise. FIG. 1C illustrates an example of the image data rotated clockwise by the driver. As illustrated in FIG. 1D, a CMS area 8 is cut out from the image data after rotation. Therefore, an image displayed by the electronic rearview mirror 10 is not tilted.

Figure 1E:
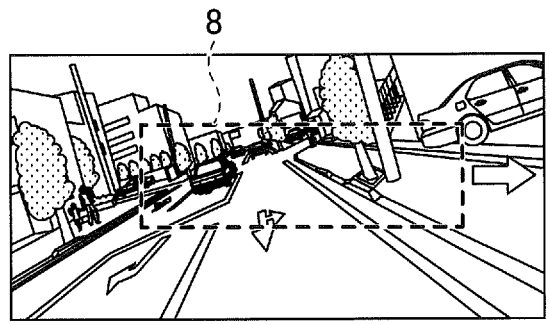

In the state of FIG. 1C, the driver may desire to move the CMS area 8 up, down, left, or right. However, even if the driver moves the CMS area 8 up, down, left, or right in the state of FIG. 10, an internal process of the electronic rearview mirror 10 causes the CMS area 8 to be moved within the image data before rotation. FIG. 1E illustrates a state in which the CMS area 8 is moved to the right by the driver within the image data before rotation.

Because the driver has operated to rotate the image of the CMS area 8, the electronic rearview mirror 10 rotates the image data after the CMS area 8 is moved to the right by the driver.

Figure 1F:
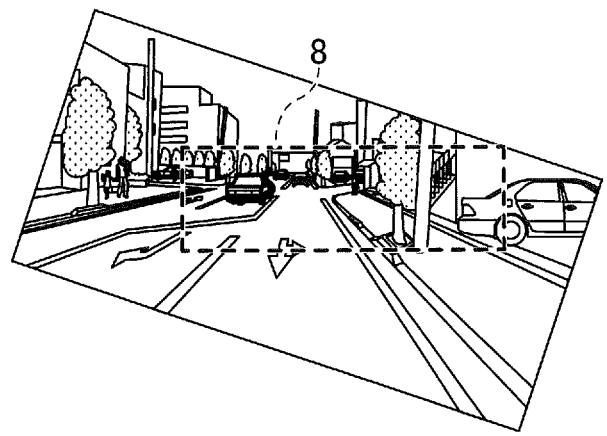

FIG. 1F illustrates the image data rotated clockwise after the movement of the CMS area 8. As compared to FIG. 1E, the CMS area 8 in FIG. 1F is moved not only to the right but also downward. Namely, although the driver desires to move the CMS area 8 to the right only, the CMS area 8 is moved obliquely downward to the right.

Figure 1G:
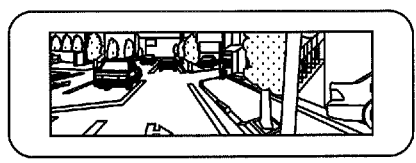

FIG. 1G illustrates an image of the CMS area 8 displayed by the electronic rearview mirror 10 after the CMS area 8 is moved to the right, and further the image data is rotated clockwise. As compared to FIG. 1D, it appears to the driver that the CMS area 8 has moved to the lower right. In order to move the CMS area 8 to the right only, the driver is required to perform an extra operation for moving the CMS area 8 upward.

As described above, even if the driver moves the position of the CMS area 8 up, down, left, or right after rotating the image data so as to allow the CMS area 8 to become horizontal, the electronic rearview mirror 10 moves the CMS area 8 up, down, left, or right within the image data before rotation. Thus, it is difficult to adjust the CMS area 8 to the position intended by the driver.

In the following, an electronic rearview mirror and an image display method performed by the electronic rearview mirror according to an embodiment of the present invention will be described with reference to the accompanying drawings.

First Embodiment

Overview of Electronic Rearview Mirror According to First Embodiment

In a case where a driver corrects an image captured by an imaging device 11 having installation error, an electronic rearview mirror according to a first embodiment performs a "process for moving a CMS area in a vertical direction or in a horizontal direction within the image that has been rotated". The CMS area is a display area within image data and is displayed on a display.

Figure 2A:
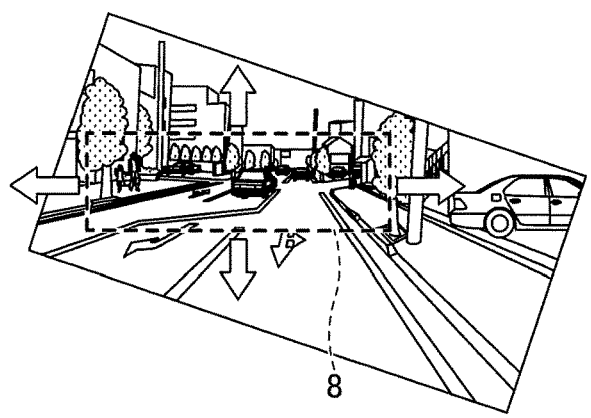
FIGS. 2A through 2D are drawings illustrating positional adjustment of a CMS area displayed by an electronic rearview mirror.
Figure 2B:
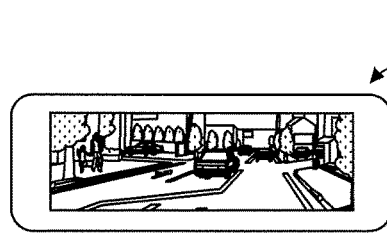

FIGS. 2A through 2D are drawings illustrating positional adjustment of a CMS area 8 displayed by the electronic rearview mirror of the present embodiment. Similar to FIG. 1C, FIG. 2A illustrates image data that has been rotated. Similar to FIG. 1C, FIG. 2B illustrates a CMS area 8 after the rotation of the image data. In this state, if the driver moves the CMS area 8 up, down, left, or right, the electronic rearview mirror 10 moves the CMS area 8 in the vertical direction or in the horizontal direction within the image data that has been rotated.

Figure 2C:
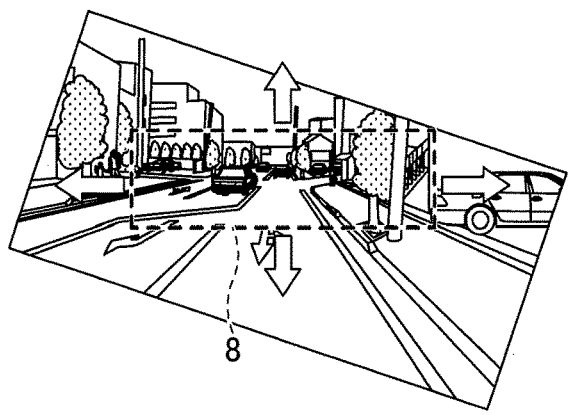
Figure 2D:
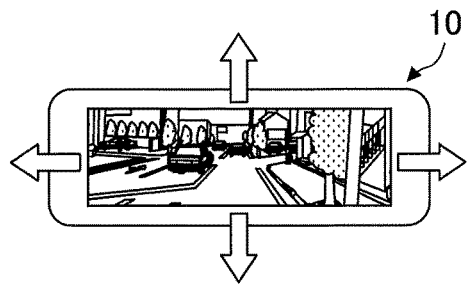

FIG. 2C illustrates the CMS area 8 that has moved to the right within the rotated image data. The above-described process moves the CMS area 8 to the right only, and does not move the CMS area 8 in the vertical direction. FIG. 2D illustrates the CMS area 8 cut out from the image data of FIG. 2C. As compared to FIG. 2B, it can be seen that the CMS area 8 of FIG. 2D is moved to the right only.

As described above, the electronic rearview mirror 10 according to the present embodiment moves the CMS area 8 in the vertical direction or in the horizontal direction within the rotated image data. Thus, it becomes possible to move the CMS area 8 up, down, left, or right only as intended by the driver, without obliquely moving the CMS area 8.

Terminology

An image display apparatus is an apparatus that displays peripheral image data captured by the imaging device 11 on a display device. The imaging device 11 is not limited to a device mounted on a vehicle. In the present embodiment, the term "electronic rearview mirror" is used; however, "electronic back-view mirror" or "electronic mirror" may also be used.

Further, the imaging device may be mounted on a moving object other than a vehicle. For example, the imaging device may be mounted on a motorized bicycle, a non-motorized vehicle such as a bicycle, a wheelchair, or a robot.

Further, the image display apparatus may be applied to a surveillance camera. The surveillance camera refers to an imaging device for performing monitoring for various purposes. The main uses of the surveillance camera include crime prevention, disaster prevention, and recording.

Further, although an "image" might refer to an image displayed on a display and "image data" might refer to intangible information, in the present embodiment, an image and image data are not strictly distinguished.

Configuration Example

Figure 3A:
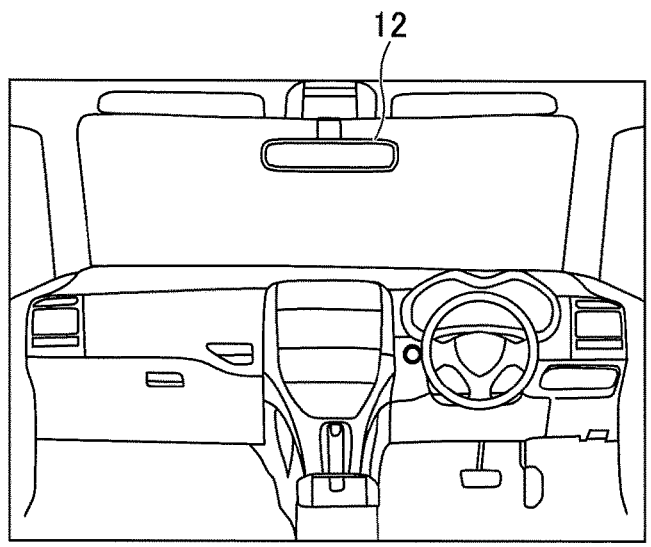
FIGS. 3A and 3B are drawings illustrating installation examples of the electronic rearview mirror.
Figure 3B:
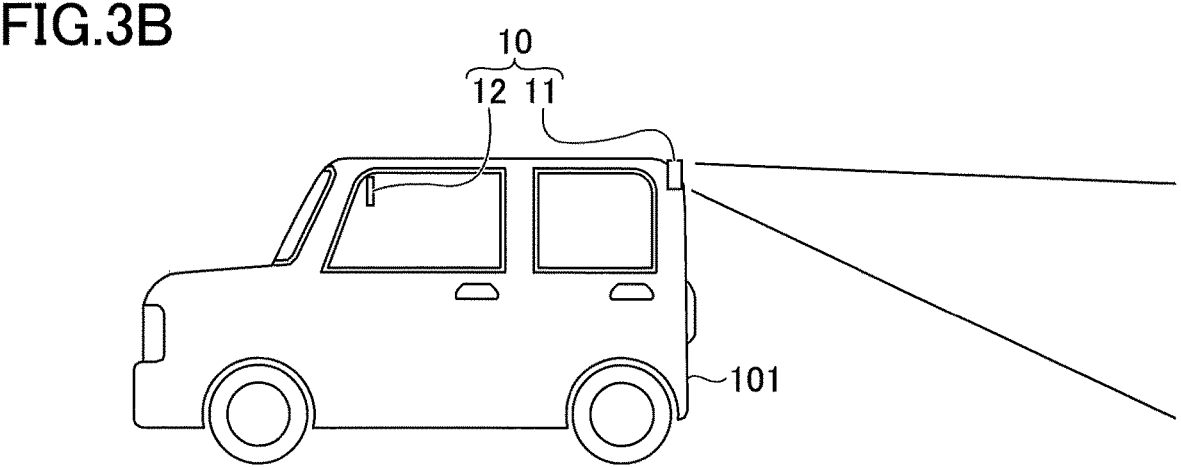

FIGS. 3A and 3B are drawings illustrating installation examples of the electronic rearview mirror 10. FIG. 3A illustrates an example in which a display unit 12 is installed within a vehicle. FIG. 3B illustrates an example in which the imaging device 11 and the display unit 12 are installed.

As illustrated in FIG. 3A, similar to a related-art rearview mirror, the display unit 12 of the electronic rearview mirror 10 is located between a driver's seat and a passenger's seat, and is fixed to the upper portion of the windshield. In some countries and regions, the position at which to install the display unit 12 is not clearly defined by laws and regulations. Thus, the illustrated installation position is merely an example. In countries and regions where the position at which to install the display unit 12 is clearly defined by laws and regulations, the display unit 12 is installed at the position defined by the laws and regulations. Further, the number of display units 12 is not limited to one, and a plurality of display units 12 may be installed.

The imaging device 11 is provided on the rear of a vehicle 101. It is preferable for the imaging device 11 to capture an image in an optical axis direction close to the direction of light incident on a related-art rearview mirror. The related-art rearview mirror is a mirror that is installed at the upper portion of the windshield and that reflects the rear view of the vehicle. Therefore, it is often preferable to install the imaging device 11 at an upper portion of the vehicle. For example, the imaging device 11 may be installed on the roof or on the roof spoiler. The imaging device 11 is preferably installed at the center or in the vicinity of the center of the vehicle in the horizontal direction. However, even if the imaging device 11 is installed on the right end or the left end of the vehicle, it is possible to capture images. Therefore, image processing may be performed such that an image, captured by the imaging device 11 installed on the right end or the left end of the vehicle, appears to be captured in the vicinity of the center of the vehicle.

The position of the imaging device 11 may be different not only on a per-vehicle-model basis, but also on a per-vehicle basis. For example, the imaging device 11 may be installed in the vicinity of a license plate, in the vicinity of a vehicle manufacturer's emblem, or at an appropriate position of a rear bumper.

Further, the vehicle 101 may include a rearview camera. The rearview camera is a camera that projects the rear view of the vehicle when the vehicle is moved backward (when the driver moves the shift lever to the reverse position) for parking in a garage, for example. In most cases, captured images are displayed on a display such as an automotive navigation system. In the present embodiment, images captured by the rearview camera may be displayed on the display unit 12. Alternatively, as images captured by the rearview camera, images captured by the imaging device 11 of the electronic rearview mirror 10 may be displayed on a display such as an automotive navigation system.

Further, a relatively wide-angle camera such as a fisheye camera may be used together with the electronic rearview mirror 10 and the rearview camera. Namely, a part of an image captured by the wide-angle camera may be displayed on the display unit 12, and another part of the image (which may overlap with the part displayed on the display unit 12) may be displayed on a display such as an automotive navigation system.

Further, a wire connecting between the imaging device 11 and the display unit 12 may be laid on the ceiling or near the floor, which may be determined by taking into account the length or the layout of the wire. Further, the imaging device 11 may transmit images to the display unit 12 via wireless communication.

Although not illustrated in FIG. 3, a power supply line, a reverse signal line, turn signal lines, and video input of other imaging devices (such as a side-view camera and the rear-view camera) may be connected to the display unit 12. For example, in response to a signal from the reverse signal line, the display unit 12 may display an image of the rearview camera, or in response to a signal from a turn signal line, the display unit 12 may display an image of the side-view camera.

Figure 4:
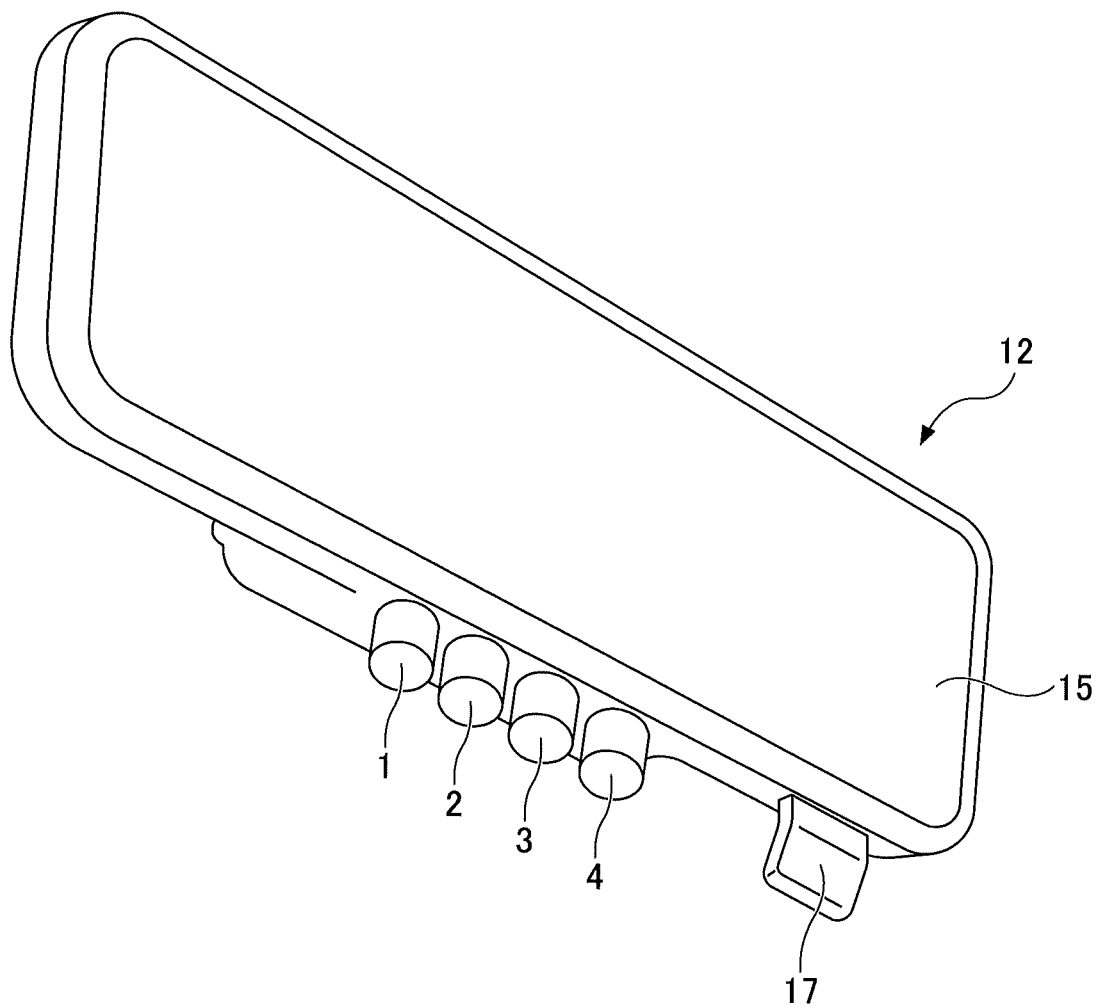
FIG. 4 is a schematic perspective view of an example of a display unit.

FIG. 4 is a schematic perspective view of an example of the display unit 12. The display unit 12 includes a display 15, four operation buttons 1 through 4, and a lever 17. Note that a wire interface is not depicted. Similar to a drive recorder, the display unit 12 may have a memory card slot in addition to the illustrated configuration. The shape of the display unit 12, and the number and positions of the buttons are merely examples.

The display 15 is a flat panel display, such as a liquid crystal display or an organic electro-luminescence (EL) display. The display 15 may be a rear-projection-type display. A half-silvered mirror is attached to the front (interior side) of the display 15 so as to be superimposed on the display 15, as will be described below.

The four operation buttons 1 through 4 are input devices for displaying a setting screen of the electronic rearview mirror 10 and receiving operations from a user. An on-screen display (OSD) is known as a function of displaying a simple setting screen; however, a method for displaying a user interface may vary depending on resources of the display unit. For example, if an operating system (OS) is installed on a board, which will be described below, a screen display function supported by the OS may be used.

The functions of the operation buttons are as follows.
Operation button 1: Displaying a menu (including luminance, contrast, color temperature, language, and CMS area settings)
Operation button 2: Selecting one direction (including moving to the right, moving up, rotating to the right, and scale-up)
Operation button 3: Selecting another direction (including moving to the left, moving down, rotating to the left, and scale-down)
Operation Button 4: OK The driver can make settings for luminance, contrast, color temperature, and language, rotate image data, and move a CMS area 8.

The lever 17 is an input device for switching between turning on and off the power of the electronic rearview mirror 10. When the power is turned on, the display unit 12 outputs an image captured by the imaging device 11. When the power is turned off, the display unit 12 does not display an image captured by the imaging device 11. In the latter case, light is reflected by the half-silvered mirror, and the display unit 12 functions as a mirror that reflects light inside of the vehicle in the same manner as an ordinary mirror, which will be described with reference to FIGS. 5A and 5B.

Figure 5A:
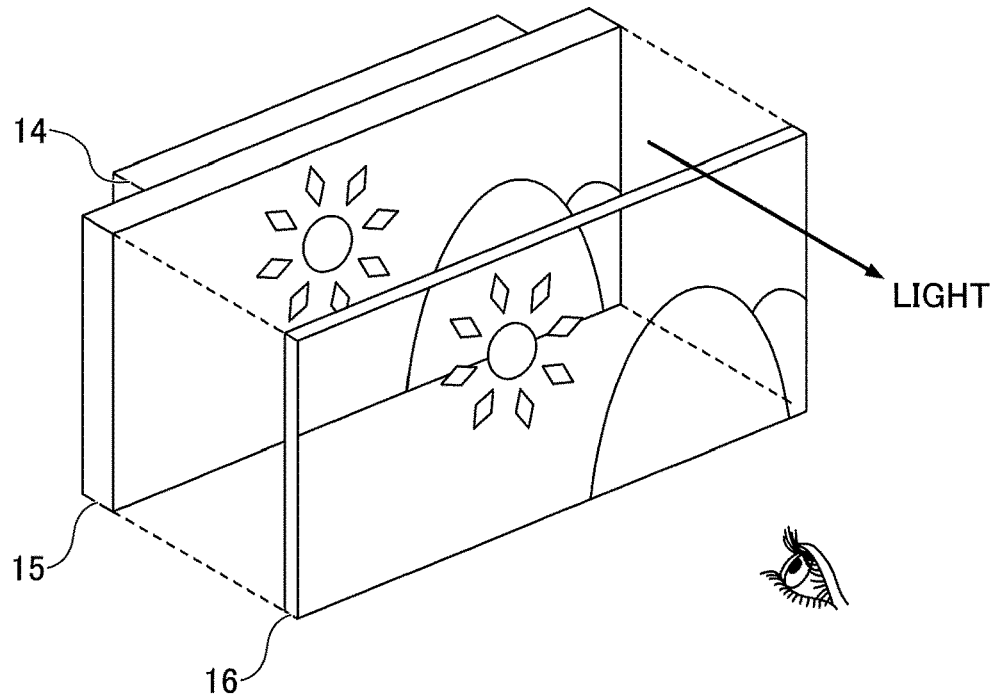
FIGS. 5A and 5B are drawings illustrating an example of a schematic structure of the display unit.
Figure 5B:
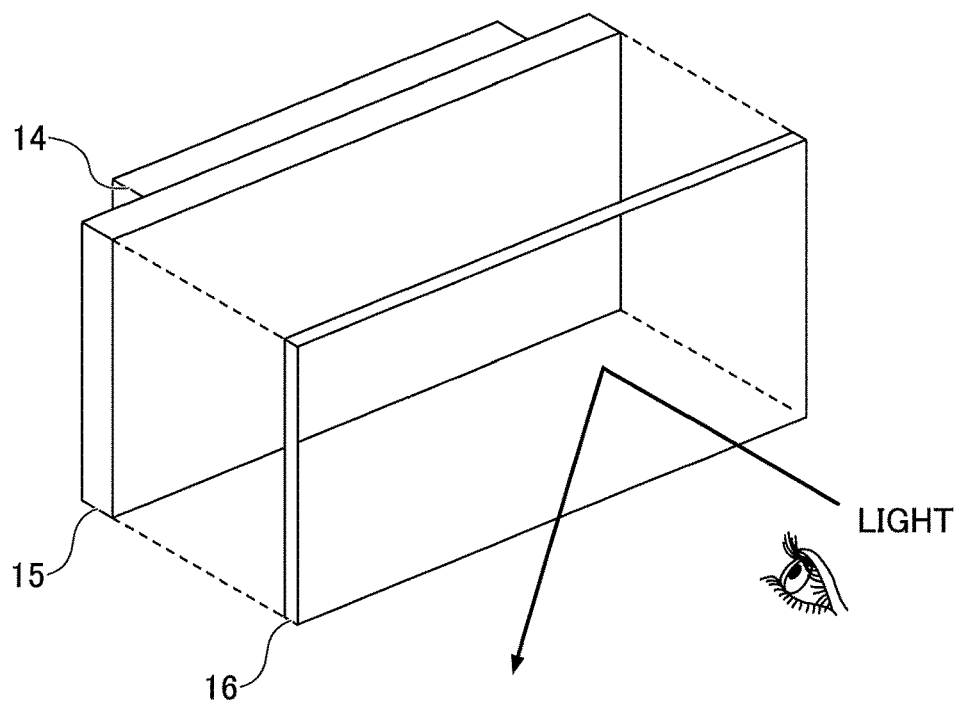

FIGS. 5A and 5B are drawings illustrating an example of a schematic structure of the display unit 12. FIG. 5A illustrates a state of a half-silvered mirror 16 when the power is turned on, and FIG. 5B illustrates a state of the half-silvered mirror 16 when the power is turned off. For example, if the transmittance of the half-silvered mirror 16 is T % (for example, 50% to 90%), T % of light from the display 15 passes through the half-silvered mirror 16 when the power is turned on. Even if only T % of light passes through the half-silvered mirror 16, the driver can visually recognize an image displayed on the display 15 because the display 15 is brighter than the inside of the vehicle.

When the power is turned off, the inner side of the half-silvered mirror 16 becomes dark because the display 15 does not emit light. In this case, the inside of the vehicle is brighter than the inner side of the half-silvered mirror 16, and thus, the intensity of light reflected by the half-silvered mirror 16 becomes large. As a result, light transmitted through the half-silvered mirror 16 is obscured by bright reflected light inside the vehicle. Thus, the display unit 12 looks like a mirror when viewed from the inside of the vehicle. Accordingly, by pushing the lever backward and forward, the driver can readily switch between the display 15 displaying images and the ordinary mirror reflecting light inside of the vehicle. For example, if the visibility of the display 15 is decreased because of strong light of the westering sun incident from the rear of the vehicle, the driver may switch to the ordinary mirror.

As illustrated in FIGS. 5A and 5B, the display unit 12 includes a board 14, and uses the board 14 to perform image processing, such as controlling the imaging device 11 and cutting out a CMS area 8. The board 14 includes general computer functions, and also a CPU, a RAM, a ROM, a flash memory, and an input and output interface (I/F).

<Functions of Display Unit>

Figure 6:
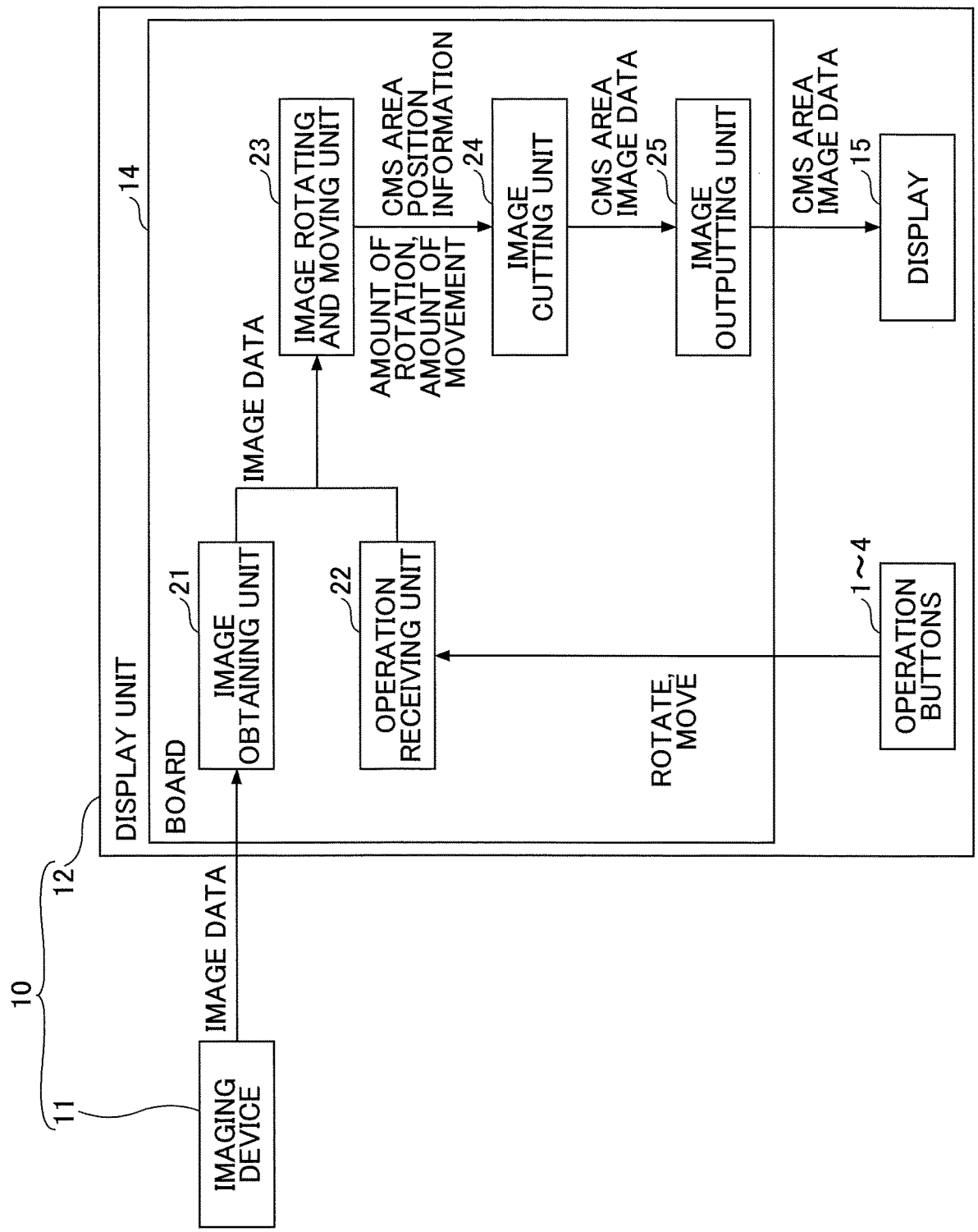
FIG. 6 is a functional block diagram illustrating an example of functions of the display unit.

Referring to FIG. 6, functions of the display unit 12 will be described. FIG. 6 is a functional block diagram illustrating an example of functions of the display unit 12. The display unit 12 includes an image obtaining unit 21, an operation receiving unit 22, an image rotating and moving unit 23, an image cutting unit 24, and an image outputting unit 25. The functions of the display unit 12 are functions or means implemented by causing the CPU included in the board 14 of the display unit 12 to execute a program.

The board 14 performs general control of the imaging device 11. For example, the board 14 performs exposure control that controls one or both of the shutter speed and sensitivity (gain level), such that the brightness of an image is at an appropriate level. In addition, the board 14 performs a process called an auto-white balance control (AWB control), in which proportions of R, G, and B are set to be approximately the same so as to avoid changes in a white color and other colors of an object under different color temperatures of light sources. In addition, the board 14 generates a drive signal so that an imaging element can perform an imaging operation at an appropriate timing, and transmits a clock signal to an A/D converter. The board 14 may perform other processes such as removing noise, and adjusting the sharpness of an image by extracting and emphasizing edge components only.

The image obtaining unit 21 sequentially obtains image data from the imaging device 11 at a predetermined frame rate. Accordingly, an image is assumed to be a moving image, but may be a still image.

The operation receiving unit 22 receives various operations for the electronic rearview mirror, in response to the driver operating the operation buttons 1 through 4. In the present embodiment, the operation receiving unit 22 receives rotation of an image and movement of a CMS area 8. It is assumed that the relationship between the operation of the operation buttons 1 through 4 versus the amount of rotation and the amount of movement is preset as follows, for example.

By pressing an operation button once in the case of the rotation of an image being received via the setting screen, the image is rotated by θ degrees. By pressing an operation button once in the case of the movement of a CMS area 8 being received via the setting screen, the CMS area 8 is moved by N pixels.

The image rotating and moving unit 23 obtains one or both of the amount of rotation and the amount of movement received by the operation receiving unit 22, rotates image data, and moves a CMS area 8 vertically or horizontally. In the present embodiment, in a case where the driver desires to move a CMS area 8 up, down, left, or right after rotating image data, the image rotating and moving unit 23 moves the CMS area 8 in the vertical direction or in the horizontal direction within the image data that has been rotated.

The image cutting unit 24 cuts the CMS area 8 from the image data, and generates CMS area image data. The CMS area image data is image data having approximately the same size as the display 15. Note that the CMS area 8 may be scaled up or scaled down in accordance with an operation performed by the driver. A cutting process may be referred to as trimming. The image outputting unit 25 outputs the CMS area image data to the display 15, and causes the display 15 to display the CMS area image data.

<Process for Rotating Image and Moving CMS Area>

Next, a process for rotating an image and moving a CMS area 8 will be described with reference to FIGS. 7A through 7D. FIGS. 7A through 7D are drawings illustrating an example of a coordinate system of image data and coordinates of a CMS area 8.

Figure 7A:
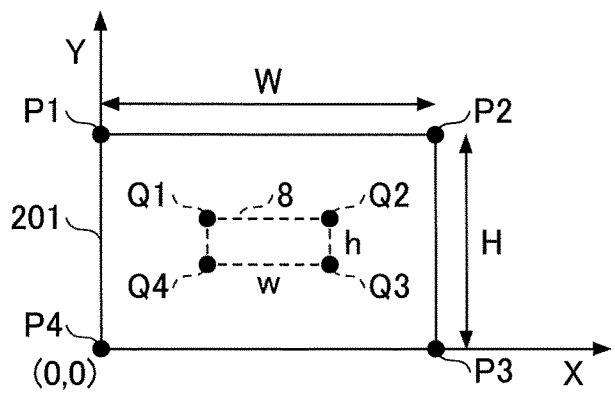
FIGS. 7A through 7D are drawings illustrating an example of a coordinate system of image data and coordinates of a CMS area.

First, as illustrated in FIG. 7A, a coordinate system (an orthogonal coordinate system) having the X-axis and the Y-axis is provided, and image data 201 is placed in the coordinate system. The coordinate system is fixed, and does not rotate when image data is rotated. The image rotating and moving unit 23 places image data captured by the imaging device 11 having installation error (namely, an object in the image data is tilted) in the coordinate system, in such a manner that the horizontal direction of the image data becomes parallel to the X-axis. As an example, in FIG. 7A, the origin (0, 0) is located at the lower left corner of the image data 201. Because the width W and the height H of the image data 201 are fixed, coordinates P1 to P4 of the corners of the image data 201 can be readily obtained.

The CMS area 8 is set at a predetermined position of the image data 201. The position of the CMS area 8 in FIG. 7A may be a predetermined initial position, or may be a position adjusted by a driver. The width w and the height h of the CMS area 8 are fixed. Thus, when any one of coordinates of the center and coordinates Q1 through Q4 of the corners is determined, the rest of the coordinates can be readily obtained.

$$Q1(X1,Y1), Q2(X2,Y2), Q3(X3,Y3), Q4(X4,Y4)$$

Figure 7B:
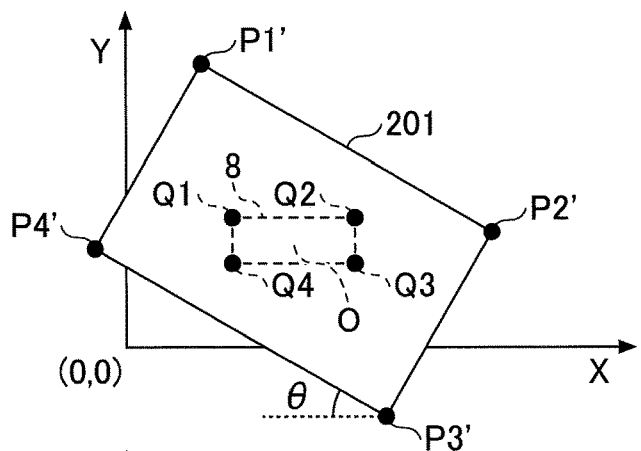

FIG. 7B illustrates the image data 201 rotated by θ degrees by the driver. The image data 201 is rotated by θ degrees around the center O. If the CMS area 8 were rotated together, the position of the CMS area 8 would not be corrected. Thus, no change is made to the coordinates Q1 through Q4 (namely, the CMS area 8 is not rotated). Accordingly, the tilt of CMS area image data to be displayed on the display 15 is corrected.

The rotation of the image data 201 by the image rotating and moving unit 23 is expressed as follows. A formula (1) expresses that, after rotating with the center of image data moved to the origin (0, 0), the image data is translated to the original position. Coordinates of any pixel of the image data 201 after rotation are calculated by the formula (1). P1' through P4' denote coordinates of the corners of the image data after rotation.

[Formula 1]

$$\begin{pmatrix} X' \\ Y' \end{pmatrix} = \begin{pmatrix} \cos\theta & -\sin\theta \\ \sin\theta & \cos\theta \end{pmatrix} \begin{pmatrix} X - \frac{W}{2} \\ Y - \frac{H}{2} \end{pmatrix} + \begin{pmatrix} \frac{W}{2} \\ \frac{H}{2} \end{pmatrix} \quad (1)$$

Figure 7C:
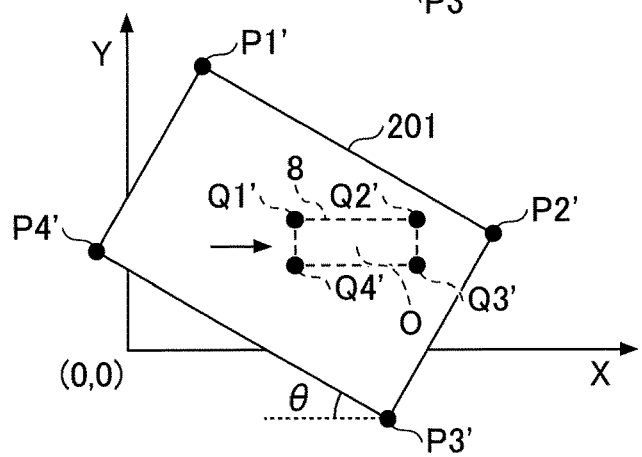
Figure 7D:
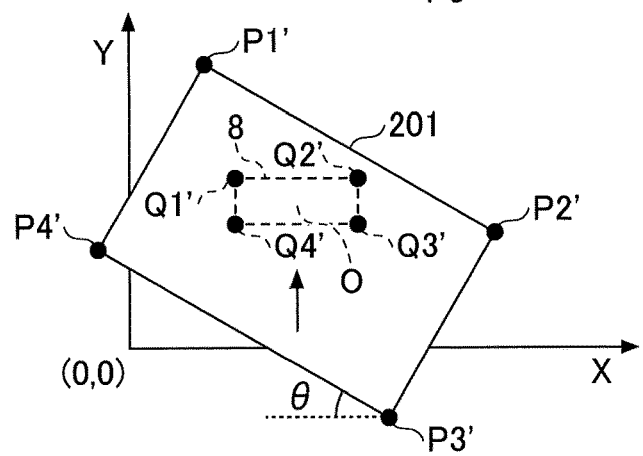

Next, FIG. 7C illustrates the CMS area 8 that has moved to the right, and FIG. 7D illustrates the CMS area 8 that has moved upward. For example, assuming that the CMS area 8 is moved to the right by 100 pixels, coordinates of the moved CMS area 8 are represented by Q1' (X1', Y1') through Q4' (X4', Y4').

$$X1'=X1+100, X2'=X2+100, X3'=X3+100, X4'=X4+100$$

No change is made to Y1 through Y4. The image cutting unit 24 cuts a rectangular area identified by the coordinates Q1' (X1', Y1') through Q4' (X4', Y4'). If the CMS area 8 is moved upward, coordinates Y' are calculated in accordance with the amount of movement.

Accordingly, the electronic rearview mirror 10 can move a CMS area 8 in the vertical direction or in the horizontal direction within image data after rotation.

<Operation Procedure>

FIG. 8 is a flowchart illustrating an example of a process in which the electronic rearview mirror displays CMS area image data. The process illustrated in FIG. 8 is repeatedly performed while the electronic rearview mirror is turned on.

First, the image obtaining unit 21 obtains image data from the imaging device 11 (S10). Image data is sequentially transmitted from the imaging device 11.

The operation receiving unit 22 receives rotation of the image data in response to the driver's operation of the operation buttons 1 through 4 (S20). Although the image data in real time switches to next image data, the amount of rotation received by the operation receiving unit 22 may be commonly applied to all images.

The image rotating and moving unit 23 rotates the image data in accordance with the amount of rotation received by the operation receiving unit (S30).

Further, the operation receiving unit 22 receives movement of a CMS area 8 in response to the driver's operation of the operation buttons 1 through 4 (S40).

The image rotating and moving unit 23 moves the CMS area 8 in the vertical direction or in the horizontal direction within the rotated image data (S50).

The image cutting unit 24 cuts, from the image data, the CMS area 8 located at a position determined by the amount of rotation and the amount of movement received by the operation receiving unit (S60).

The image outputting unit 25 displays CMS area image data on the display 15 (S70).

SUMMARY

As described above, the electronic rearview mirror 10 according to the present embodiment moves the CMS area 8 in the vertical direction or in the horizontal direction within the rotated image data. Thus, it becomes possible to move the CMS area 8 up, down, left, or right only as intended by the driver, without obliquely moving the CMS area 8.

Second Embodiment

In the first embodiment, an example in which a CMS area 8 is moved vertically or horizontally after the rotation of image data has been described. In a second embodiment, an example in which image data is rotated after the vertical or horizontal movement of a CMS area 8 will be described.

<Problem with Rotating Image Data after CMS Area is Vertically or Horizontally Moved>

Figure 9A:
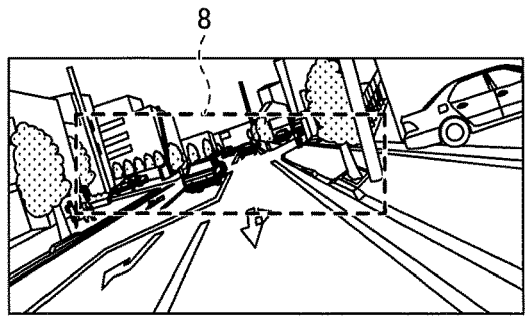
FIGS. 9A through 9F are drawings illustrating a problem with rotating image data after a CMS area is vertically or horizontally moved.
Figure 9B:
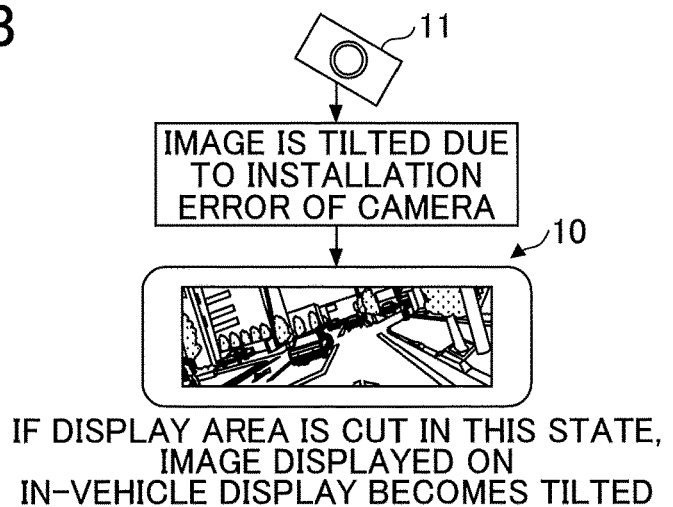

FIGS. 9A through 9F are drawings illustrating a problem with rotating image data after a CMS area is vertically or horizontally moved. As illustrated in FIG. 9A and FIG. 9B, because the imaging device 11 installed on the rear of the vehicle is rotated clockwise due to installation error, CMS area image data displayed by an electronic rearview mirror 10 is tilted.

Figure 9C:
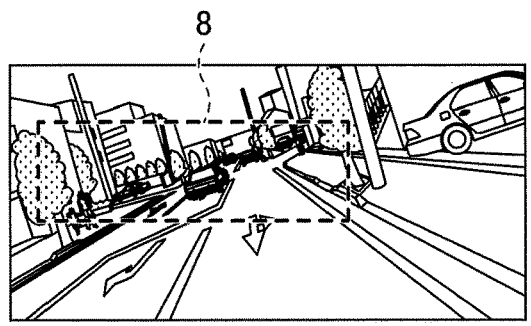
Figure 9D:
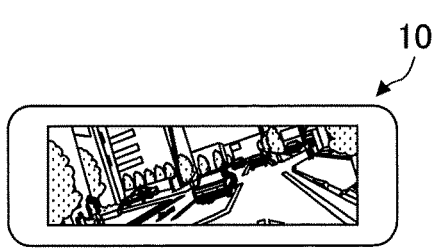

Before rotating the image data, the CMS area 8 has moved vertically or horizontally by a driver. FIG. 9C illustrates an example of image data in which the CMS area 8 has moved to the left. In this state, the CMS area 8 displayed on the display 15 of the electronic rearview mirror 10 is cut out. As illustrated in FIG. 9D, CMS area image data displayed by the electronic rearview mirror 10 remains tilted.

Figure 9E:
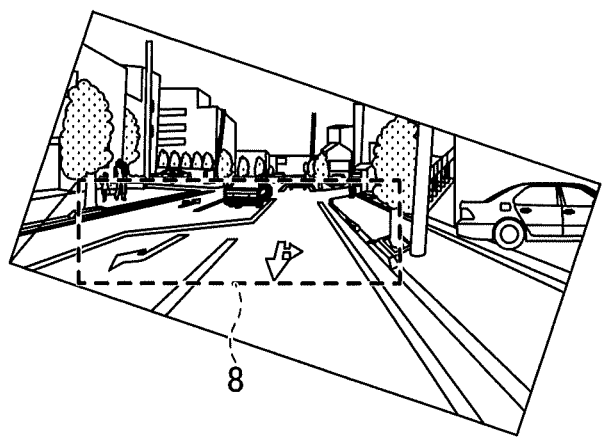

Next, the driver rotates the image data. Namely, the image data is rotated clockwise. FIG. 9E illustrates the image data after rotation. By rotating the image data, the tilt of the image data due to the installation error of the imaging device 11 is corrected, thus allowing the object to become horizontal.

Figure 9F:
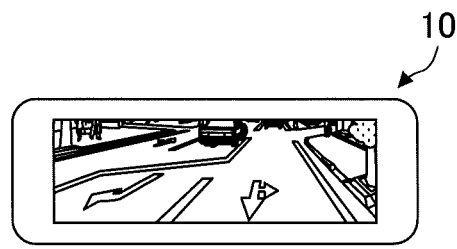

However, the CMS area 8 is not rotated by the image rotating and moving unit 23. Thus, only the image data is rotated while the CMS area 8 remains fixed. FIG. 9F illustrates the CMS area image data cut from the image data of FIG. 9E. As compared to FIG. 9D, the CMS area data has moved downward. Thus, it appears to the driver that the CMS area image data has moved downward.

As described above, if the driver only desires to correct the tilt of the image data by rotation without moving the CMS area 8 in the vertical direction, operability would not be provided as desired by the driver.

The problem described with reference to FIGS. 9A through 9F may arise when the center of the image data does not coincide with the center of the CMS area 8. In FIGS. 9A through 9F, because the CMS area 8 is located at the left end of the image data, the CMS area image data appears to be moved downward after the rotation of the image data. If the CMS area 8 is located at the right end of the image data, the CMS area image data would appear to be moved upward after the rotation of the image data. Similarly, if the CMS area 8 is located at the upper side of the image data, the CMS area image data would appear to be moved to the left after the rotation of the image data, and if the CMS area 8 is located at the lower side of the image data, the CMS area image data would appear to be moved to the right after the rotation of the image data (the image data is assumed to be rotated clockwise in all the cases).

<Overview of Electronic Rearview Mirror According to Second Embodiment>

In a case where a CMS area of an image captured by the imaging device 11 having installation error is moved first in the vertical direction or in the horizontal direction, and the image is thereafter rotated for correction by a driver, an electronic rearview mirror according to the second embodiment performs a "process for moving the CMS area in the vertical direction or in the horizontal direction in accordance with the amount of rotation".

FIGS. 10A through 10G are drawings illustrating positional adjustment of a CMS area 8 by the electronic rearview mirror according to the present embodiment. FIGS. 10A through 10E are the same as FIGS. 9A through 9E.

Figure 10A:
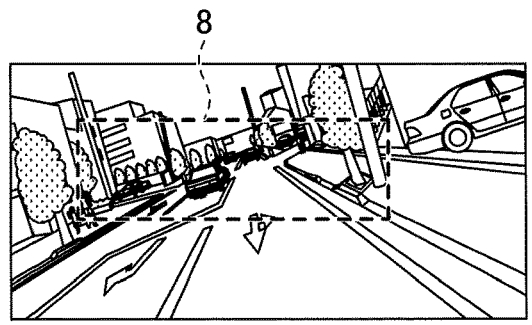
FIGS. 10A through 10G are drawings illustrating positional adjustment of a CMS area by an electronic rearview mirror.
Figure 10B:
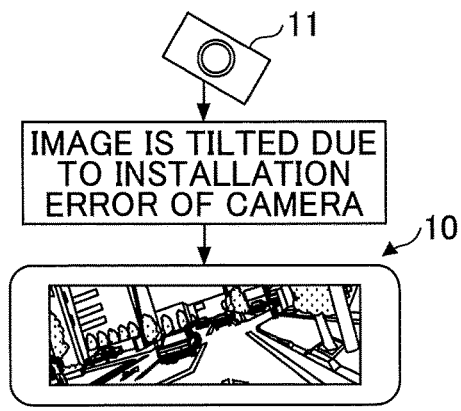
Figure 10C:
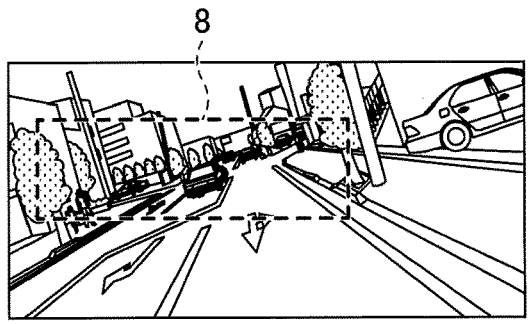
Figure 10D:
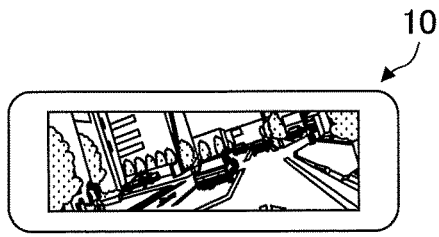
Figure 10E:
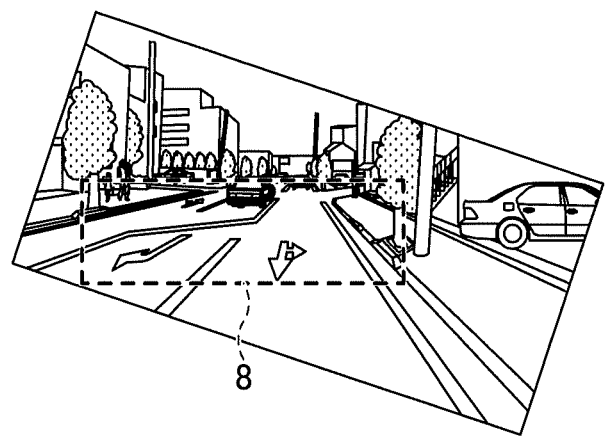
Figure 10F:
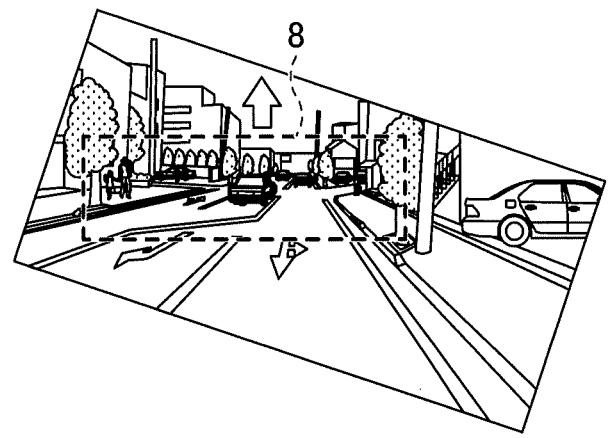
Figure 10G:
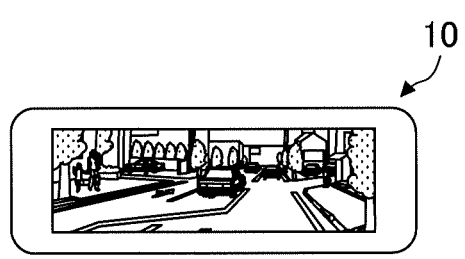

As a solution to the above-described problem in that it appears to the driver that CMS area image data has moved downward, the image rotating and moving unit 23 of the present embodiment moves a CMS area 8 upward. FIG. 10F illustrates image data in which a CMS area 8 is moved upward. FIG. 10G illustrates CMS area image data cut from the image data of FIG. 10F. By moving the CMS area 8 upward after the rotation of the image data, the CMS area image data is not moved upward as is seen from FIG. 10G.

Accordingly, the electronic rearview mirror of the present embodiment moves a CMS area 8 up, down, left, or right in accordance with the rotation of image data. Thus, image data can be rotated only as intended by the driver.

In the present embodiment, the functional block diagram of FIG. 6 described in the first embodiment can be incorporated.

<Process for Moving CMS Area and Rotating Image>

A process for moving a CMS area 8 and rotating an image will be described with reference to FIGS. 11A through 11D. FIGS. 11A through 11D are drawings illustrating an example of a coordinate system of image data and coordinates of a CMS area 8.

Figure 11A:
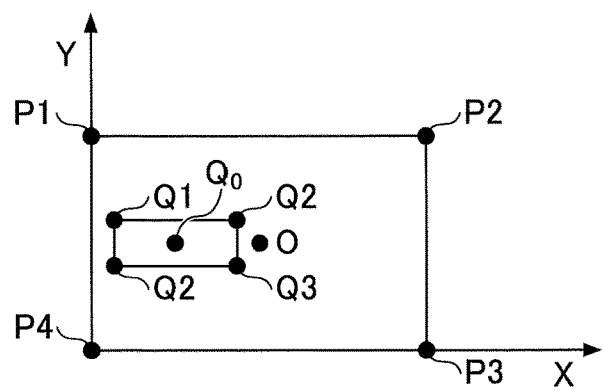
FIGS. 11A through 11D are drawings illustrating an example of a coordinate system of image data and coordinates of a CMS area.

As illustrated in FIG. 11A, in the illustrated coordinate system, it is assumed that a driver has moved a CMS area 8 to the left within image data 201 before rotation. O denotes the center of the image data 201, and $Q_0$ denotes the center of the CMS area 8.

Figure 11B:
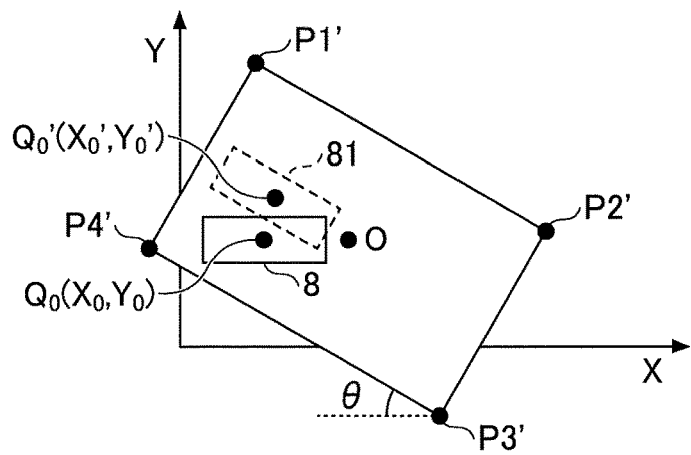

FIG. 11B illustrates the CMS area 8 after the image data 201 is rotated by the driver, and illustrates a virtual CMS area 81 rotated together with the image data 201. In reality, the CMS area 8 is not rotated together with the image data 201, and the virtual CMS area 81 is illustrated for convenience of description. Coordinates of the center $Q_0$ of the CMS area 8 are assumed to be $(X_0, Y_0)$, and coordinates of the center $Q_0'$ of the virtual CMS area 81 are assumed to be $(X_0', Y_0')$.

By moving the center $Q_0$ of the CMS area 8 to the center $Q_0'$, CMS area image data can be properly displayed even after the rotation of image data. The image rotating and moving unit 23 moves the CMS area 8 based on differences between $Q_0$ and $Q_0'$.

Figure 11C:
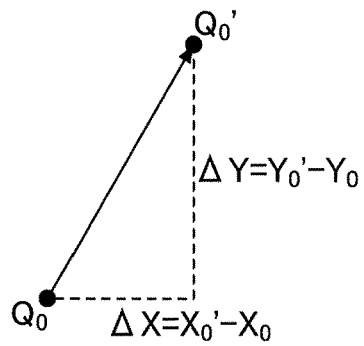

FIG. 11C illustrates an example of differences between $Q_0$ and $Q_0'$. The coordinates $(X_0, Y_0)$ of $Q_0$ are values input by the driver by using the operation buttons 1 through 4. The coordinates $(X_0', Y_0')$ of $Q_0'$ can be calculated by the formula (1) of the first embodiment. Accordingly, differences ($\Delta X$, $\Delta Y$) can be calculated as follows.

$$\Delta X = X_0' - X_0$$

$$\Delta Y = Y_0' - Y_0$$

Figure 11D:
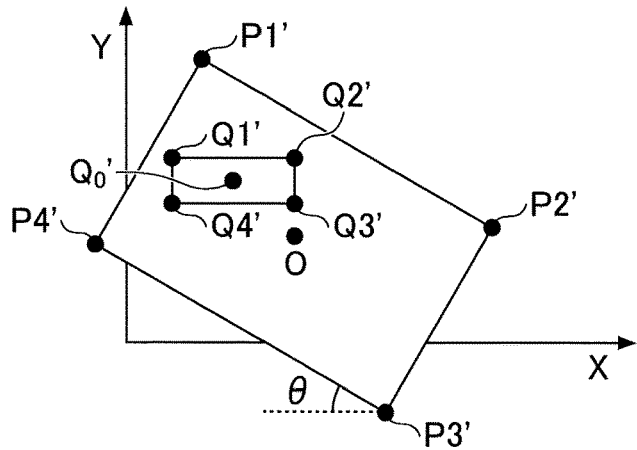

FIG. 11D illustrates an example of the CMS area 8 whose position is corrected in the rotational direction of the image data based on the differences ($\Delta X$, $\Delta Y$). The image rotating and moving unit 23 calculates coordinates Q1' through Q4' of the CMS area 8 that have moved in a direction conforming to the rotational direction of the image data, by adding the differences ($\Delta X$, $\Delta Y$) to the coordinates Q1 through Q4 of FIG. 11B.

<Operational Procedure>

Figure 12:
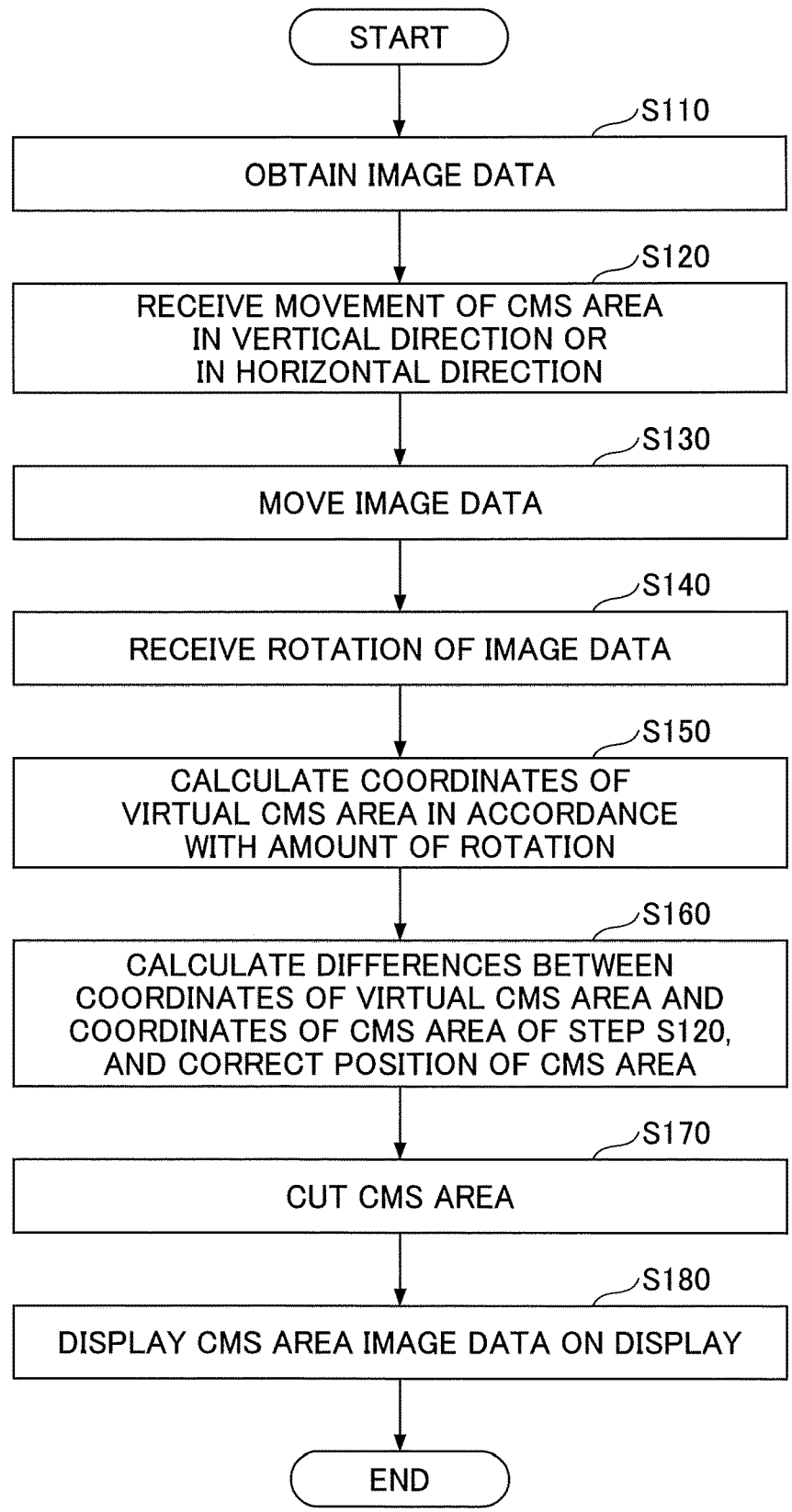
FIG. 12 is a flowchart illustrating an example of a process in which the electronic rearview mirror displays CMS area image data.

FIG. 12 is a flowchart illustrating an example of a process in which the electronic rearview mirror 10 displays CMS area image data. The process illustrated in FIG. 12 is repeatedly performed while the electronic rearview mirror is turned on.

First, the image obtaining unit 21 obtains image data from the imaging device 11 (S110). Image data is sequentially transmitted from the imaging device 11.

The operation receiving unit 22 receives movement of a CMS area 8, in response to the driver's operation of the operation buttons 1 through 4 (S120).

The image rotating and moving unit 23 moves the CMS area 8 in accordance with the amount of movement received by the operation receiving unit (S130).

Next, the operation receiving unit 22 receives rotation of the image data in response to the driver's operation of the operation buttons 1 through 4 (S140). Although the image data in real time switches to next image data, the amount of rotation received by the operation receiving unit 22 may be commonly applied to all images.

The image rotating and moving unit 23 calculates coordinates of a virtual CMS area 81 in accordance with the amount of rotation (S150). Because the width w and the height h of the CMS area 8 are known, the image rotating and moving unit 23 may calculate coordinates of the center of the virtual CMS area 81 or coordinates of one of the four corners of the virtual CMS area 81.

Next, the image rotating and moving unit 23 calculates differences between coordinates of the virtual CMS area 81 and coordinates of the CMS area 8 of step S120, and corrects the position of the CMS area 8 (S160).

The image cutting unit 24 cuts, from the image data, the CMS area 8 located at the position corrected by the image rotating and moving unit 23 (S170).

The image outputting unit 25 displays CMS area image data on the display 15 (S180).

SUMMARY

As described above, the electronic rearview mirror according to the present embodiment can avoid the movement of a CMS area 8 in the direction not intended by a driver, even when image data is rotated for correction, after the CMS area 8 is moved in the vertical direction or in the horizontal direction.

Third Embodiment

In a third embodiment, an electronic rearview mirror 10 that can be employed in both the image processing of the first embodiment and the image processing of the second embodiment will be described.

A process may be separated in accordance with whether a CMS area 8 is moved after the rotation of image data (first embodiment) or image data is rotated in a state where the center of the image data does not coincide with the center of the CMS area 8 (second embodiment).

Figure 13:
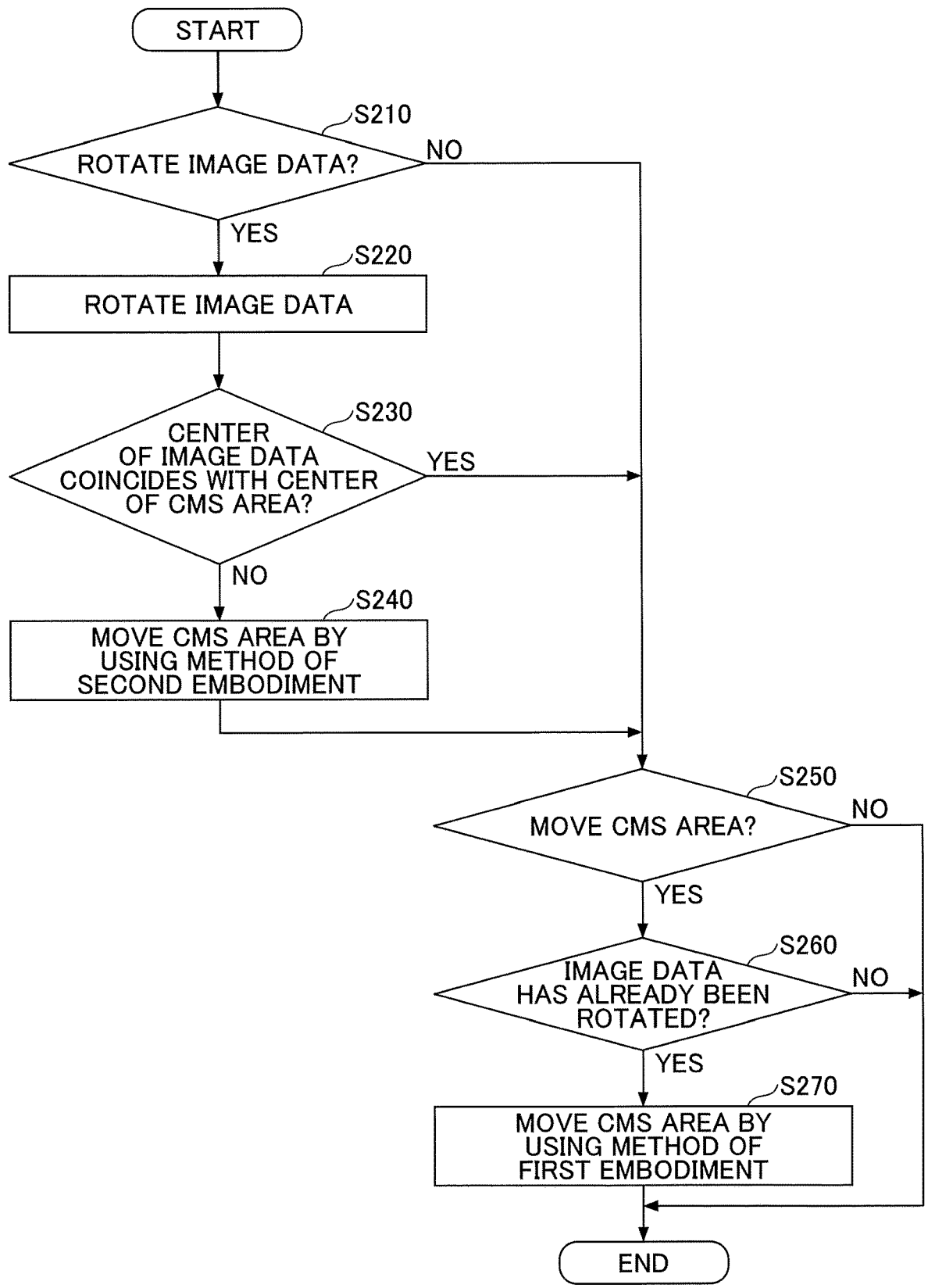
FIG. 13 is a flowchart illustrating an example of a process for selecting a method for displaying CMS area image data.

FIG. 13 is a flowchart illustrating an example of a process for selecting a method for displaying CMS area image data.

First, the operation receiving unit 22 determines whether a rotation operation of image data is received (S210). If it is determined that the rotation operation is not received (no in step S210), the process proceeds to step S250.

If it is determined that the rotation operation is received (yes in step S210), the image rotating and moving unit 23 rotates the image data (S220). Namely, as in the first embodiment and the second embodiment, the rotation of the image data can be applied.

Next, the image rotating and moving unit 23 determines whether the center of the image data coincides with the center of a CMS area 8 (S230). If it is determined that the center of the image data coincides with the center of the CMS area 8 (yes in step S230), the process proceeds to step S250.

If it is determined that the center of the image data does not coincide with the center of the CMS area 8 (no in step S230), the image rotating and moving unit 23 moves the CMS area 8 by using the method of the second embodiment (S240). Specifically, because CMS area image data appears to have moved in the vertical direction or in the horizontal direction due to the rotation of the image data, the image rotating and moving unit 23 corrects the position of the CMS area 8.

In step S250, the operation receiving unit determines whether a movement operation of the CMS area 8 is received (S250). If it is determined that a movement operation of the CMS area 8 is not received (no in step S250), it means that the operation is not performed by the driver. Thus, the process of FIG. 13 ends.

If it is determined that the movement operation of the CMS area 8 is received (yes in step S250), the image rotating and moving unit 23 determines whether the image data has already been rotated (S260). The reason is because if the CMS area 8 were to be moved after the rotation of the image data without correction, it would appear to the driver that CMS area image data has obliquely moved. If it is determined that the image data has not been rotated (no in step S260), the process of FIG. 13 ends.

If it is determined that the image data has already been rotated (yes in step S260), the image rotating and moving unit 23 moves the CMS area 8 by using the method of the first embodiment (S270).

SUMMARY

Accordingly, the electronic rearview mirror according to the present embodiment integrates the imaging processing according to the first embodiment with the imaging processing according to the second embodiment, and readily adjusts the position of a CMS area 8 to an intended position regardless of whether the driver rotates image data first or moves the CMS area 8 first.

Other Application Examples

Although the embodiments have been specifically described above, the present invention is not limited to these embodiments. Various variations and modifications may be made to the described subject matter without departing from the scope of the present invention.

For example, in the above-described embodiments, the driver corrects image data captured by the imaging device 11 having installation error by rotating the image data. However, installation error of the imaging device 11 may be detected by the imaging device 11 or the display unit. For example, when the imaging device 11 includes an acceleration sensor, the acceleration sensor may detect the orientation (installation error) of the imaging device 11, and the image rotating and moving unit 23 may automatically cancel the amount of rotation calculated based on the orientation (installation error) of the imaging device 11. Alternatively, imaging processing may be used to detect the amount of rotation of an image captured by the imaging device 11. For example, machine learning may learn the relationship between images and the orientation of the imaging device 11 beforehand, and may detect the orientation of the imaging device 11 mounted on a vehicle. The image rotating and moving unit 23 may rotate image data so as to cancel the rotation of the image data based on the detected orientation.

Further, in the above-described embodiments, an example in which a rearview mirror including a CMS has been described; however, a display device including the CMS is not limited to the rearview mirror. For example, if a side-view mirror includes the CMS, the CMS can be preferably used to correct the tilt and movement of image data at the rear lateral side of a vehicle. Further, the CMS can be preferably used to correct the tilt and movement of image data displayed on a display of a navigation system or on a back-seat display. Further, the CMS can be preferably used to correct the tilt and movement of image data displayed on a display disposed within a vehicle.

The example configuration of FIG. 6 illustrates main functions in order to facilitate understanding of the processes performed by the electronic rearview mirror 10. The present invention is not limited by the configuration of the divided processing units or the names of the processing units. A process performed by the electronic rearview mirror 10 may be divided into more processing units in accordance with details of the process. Further, the process performed by the electronic rearview mirror 10 may be divided such that one processing unit include more steps.

Further, the operation receiving unit 22 is an example of a receiving unit, the image rotating and moving unit 23 is an example of an image processing unit, the image cutting unit 24 is an example of an image cutting unit, and the image outputting unit 25 is an example of an outputting unit.

What is claimed is:

1. An image display apparatus comprising:
    an imaging device configured to generate image data;
    a receiving unit configured to receive movement of a display area in a vertical direction or in a horizontal direction within the image data, the display area being displayed on a display device, and also rotation of the image data;
    an image processing unit configured to rotate the image data in accordance with an amount of rotation received by the receiving unit, and, in a case where the movement of the display area in a vertical direction or in a horizontal direction relative to the rotated image data that is displayed on the display device is received by the receiving unit with respect to the rotated image data, move the rotated image data in the vertical direction or in the horizontal direction relative to the rotated image data that is displayed on the display device;
    an image cutting unit configured to cut, from the image data rotated by the image processing unit, the display area moved by the image processing unit: and
    an outputting unit configured to display the display area cut by the image cutting unit on the display device.

2. The image display apparatus according to claim 1, wherein the image processing unit rotates the image data in accordance with the amount of rotation received by the receiving unit and does not rotate the display area, the image data and the display area being provided in a coordinate system, and,
    in a case where the movement of the display area in the vertical direction or in the horizontal direction is received by the receiving unit with respect to the image data rotated in the coordinate system, the image processing unit moves the display area in the vertical direction or in the horizontal direction within the image data rotated in the coordinate system, the display area being not rotated in the coordinate system.

3. The image display apparatus according to claim 1, wherein in a case where the receiving unit receives the rotation of the image data within which the display area has moved in the vertical direction or in the horizontal direction in accordance with an amount of movement received by the receiving unit, the image processing unit moves the display area in the vertical direction or in the horizontal direction in accordance with the amount of rotation of the image data.

4. The image display apparatus according to claim 3, wherein the image processing unit moves the display area within the image data provided in the coordinate system in accordance with the amount of movement received by the receiving unit, and in the case where the receiving unit receives the rotation of the image data within which the display area has moved, the image processing unit rotates the image data in accordance with the amount of rotation received by the receiving unit and does not rotate the display area, and the image processing unit moves the display area in the vertical direction or in the horizontal direction by a difference between coordinates of a virtual display area rotated together with the image data and coordinates of the display area.

5. The image display apparatus according to claim 3, wherein in a case where the receiving unit receives the rotation of the image data, the image processing unit rotates the image data in accordance with the amount of rotation, and moves the display area in the vertical direction or in the horizontal direction in accordance with the amount of rotation of the image data when a center of the image data does not coincide with a center of the display area, and moves the display area in the vertical direction or in the horizontal direction within the rotated image data when the movement of the display area in the vertical direction or in the horizontal direction is received by the receiving unit with respect to the rotated image data.

6. The image display apparatus according to claim 1, wherein the imaging device is mounted on a moving object.

7. An image display method comprising:

generating, by an imaging device configured, image data;

receiving, by a receiving unit, movement of a display area in a vertical direction or in a horizontal direction within the image data, the display area being displayed on a display device, and also rotation of the image data;

rotating, by an image processing unit, the image data in accordance with an amount of rotation received by the receiving unit, and, in a case where the movement of the display area in a vertical direction or in a horizontal direction relative to the rotated image data that is displayed on the display device is received by the receiving unit with respect to the rotated image data, moving the display area in the vertical direction or in the horizontal direction relative to the rotated image data that is displayed on the display device;

cutting, by an image cutting unit, from the image data rotated by the image processing unit, the display area moved by the image processing unit; and displaying, by an outputting unit, the display area cut by the image cutting unit on the display device.

* * * * *